(12) United States Patent
Xia et al.

(10) Patent No.: US 9,231,727 B2
(45) Date of Patent: Jan. 5, 2016

(54) IDENTIFYING DATA STREAMS IN POLARIZATION MULTIPLEXED TRANSMISSION

(71) Applicant: Verizon Patent and Licensing Inc., Basking Ridge, NJ (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 98 days.

(21) Appl. No.: 14/015,571

(22) Filed: Aug. 30, 2013

(65) Prior Publication Data

US 2015/0063808 A1    Mar. 5, 2015

(51) Int. Cl.
*H04B 10/00* (2013.01)
*H04J 14/06* (2006.01)

(52) U.S. Cl.
CPC ........................................ *H04J 14/06* (2013.01)

(58) Field of Classification Search
USPC ................................................ 398/202–214
See application file for complete search history.

(56) References Cited

U.S. PATENT DOCUMENTS

| | | | |
|---|---|---|---|
| 7,127,166 B2 * | 10/2006 | Glingener | 398/65 |
| 8,000,610 B2 * | 8/2011 | Yao | 398/152 |
| 8,032,025 B2 * | 10/2011 | Ibragimov et al. | 398/65 |
| 8,649,689 B2 * | 2/2014 | Koizumi et al. | 398/204 |
| 8,861,959 B2 * | 10/2014 | Tian et al. | 398/65 |
| 2003/0058504 A1 * | 3/2003 | Cho et al. | 359/161 |
| 2004/0131363 A1 * | 7/2004 | Kisaka et al. | 398/152 |
| 2005/0265728 A1 * | 12/2005 | Yao | 398/152 |
| 2008/0138070 A1 * | 6/2008 | Yan et al. | 398/65 |
| 2008/0232816 A1 * | 9/2008 | Hoshida et al. | 398/152 |
| 2009/0047030 A1 * | 2/2009 | Hoshida | 398/205 |
| 2010/0098411 A1 * | 4/2010 | Nakashima et al. | 398/25 |
| 2010/0329677 A1 * | 12/2010 | Kaneda et al. | 398/65 |
| 2011/0158658 A1 * | 6/2011 | Myslinski et al. | 398/208 |
| 2011/0200339 A1 * | 8/2011 | Komaki et al. | 398/208 |
| 2011/0255870 A1 * | 10/2011 | Grigoryan et al. | 398/65 |
| 2014/0363164 A1 * | 12/2014 | Kim et al. | 398/65 |

* cited by examiner

*Primary Examiner* — Agustin Bello

(57) ABSTRACT

A polarization multiplexed receiver includes a polarization separator and optical mixing, detecting and analog-to-digital components. The polarization separator receives polarization multiplexed optical signals containing a first data stream and a second data stream, and operate upon the polarization multiplexed optical signals to separate, in an optical domain, the first data stream and the second data stream to generate a first optical output having the first data stream and a second optical output having the second data stream. The optical mixing, detecting and analog-to-digital converting components receive the first and second optical outputs from the polarization separator, extract, in a digital domain, the first data stream from the first optical output of the polarization separator, and extract, in the digital domain, the second data stream from the second optical output of the polarization separator.

20 Claims, 8 Drawing Sheets

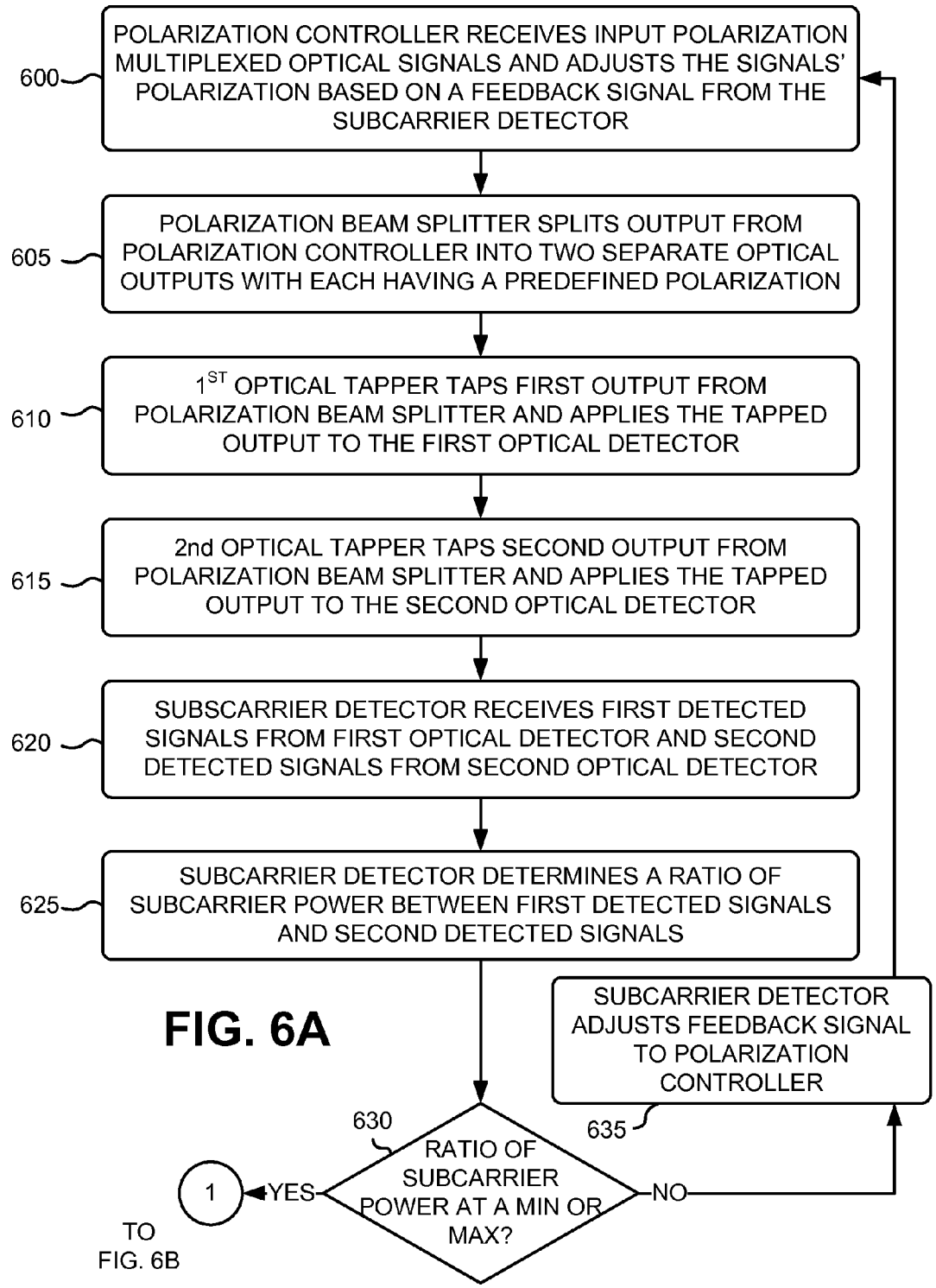

IDENTIFYING DATA STREAMS IN POLARIZATION MULTIPLEXED TRANSMISSION

BACKGROUND

In computer networking, existing transmitters for transmitting optical data may use 100 Gigabits per second transmission (100 G). 100 G typically involves a polarization multiplexed signal, where two independent data streams are polarization multiplexed at the optical transmitter. Existing 100 G polarization multiplexed systems use digital signal processing to separate the two data streams in the digital domain.

BRIEF DESCRIPTION OF THE DRAWINGS

FIGS. 6A and 6B are flow diagrams of an exemplary process for separating, in the optical domain, two data streams using a polarization separator, and extracting the two data streams, in the digital domain, using optical mixing, detecting and analog-to-digital converting components of a polarization multiplexed receiver.

DETAILED DESCRIPTION OF THE PREFERRED EMBODIMENTS

The following detailed description refers to the accompanying drawings. The same reference numbers in different drawings may identify the same or similar elements. The following detailed description does not limit the invention as claimed.

In 100 G transmission, two independent data streams are polarization multiplexed at the optical transmitter. Even though the two data streams carry independent information, they are identical as optical signals, and no technique currently exists, using current 100 G systems, for separating the two data streams in the optical domain prior to conversion into the digital domain. Exemplary embodiments described enable data input streams, which are polarization multiplexed at a transmitter, to be separated in an optical domain at a receiver such that optical functions may be used at the receiver for extracting the data input streams from receiver input optical signals, instead of using digital signal processing functions.

Separating data streams in an optical domain at the receiver is made possible by adding subcarrier modulation (e.g., low frequency shallow modulation) to one of multiple data input streams (e.g., two input streams) polarization multiplexed at the transmitter. A polarization separator at the receiver uses the subcarrier modulation to distinguish the multiple data input streams in the optical domain such that the multiple data input streams may be separated using a polarization separator described herein. By eliminating the need for digital signal processing of the polarization multiplexed signals at the receiver, monetary costs, and power consumption, associated with components of the receiver may be lowered, along with a corresponding simplification in the design of the receiver.

Figure 1:
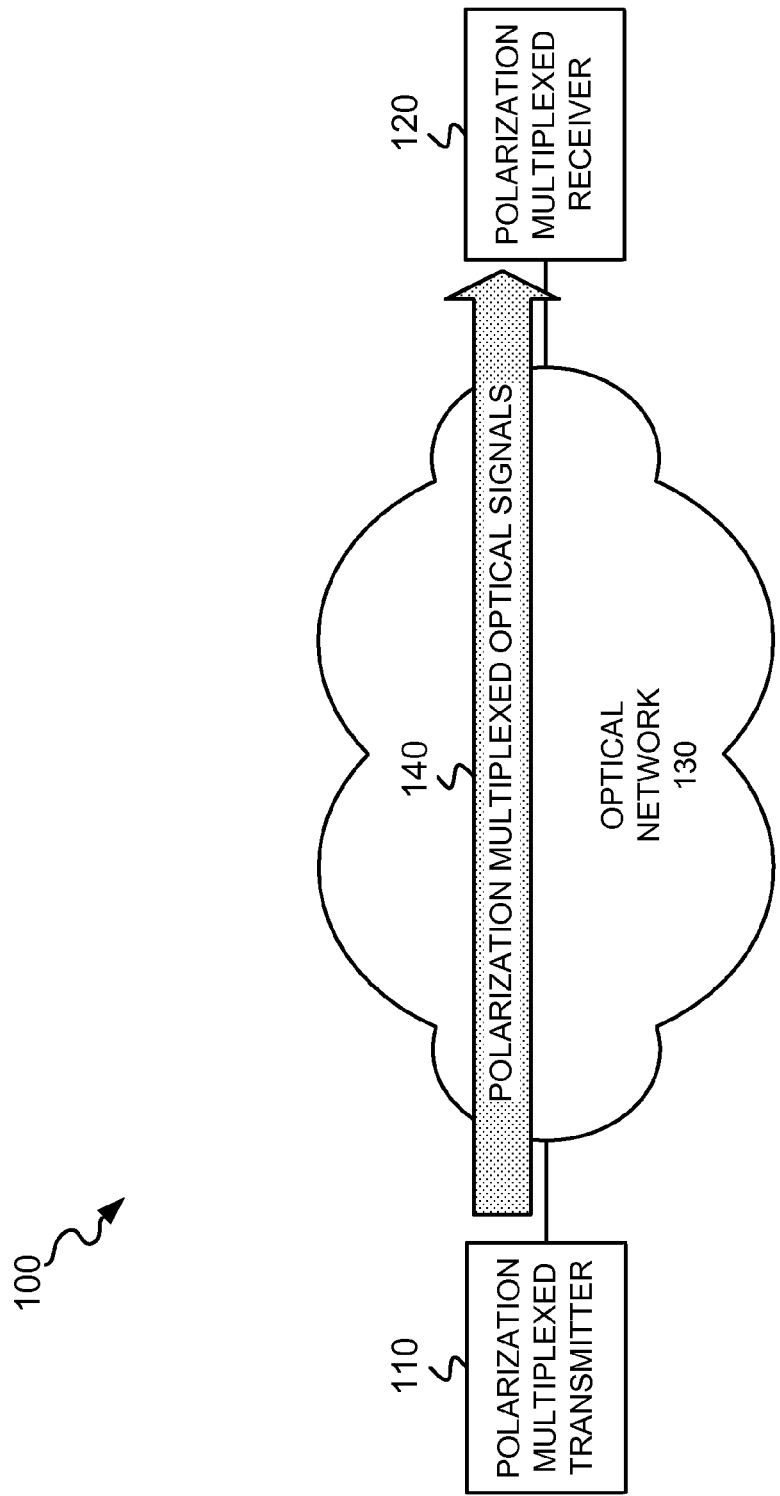
FIG. 1 illustrates an exemplary network environment in which polarization multiplexing may be used to transmit data input streams from a transmitter to a receiver.

FIG. 1 illustrates an exemplary network environment 100 in which polarization multiplexing may be used to transmit data input streams from a transmitter to a receiver. As shown in FIG. 1, network environment 100 may include a polarization multiplexed transmitter 110, a polarization multiplexed receiver 120, and an optical network 130. Polarization multiplexed transmitter 110 may transmit data input streams, via polarization multiplexed optical signals 140, to polarization multiplexed receiver 120 over optical network 130. Polarization multiplexed transmitter 110 may generate the polarization multiplexed optical signals 140 based on the data input streams as described below with respect to the exemplary embodiment of FIGS. 2 and 5. Polarization multiplexed receiver 120 may reproduce the data input streams from the received polarization multiplexed optical signals 140 as further described below with respect to the exemplary embodiments of FIGS. 3, 4 and 6. Optical network 130 may include, for example, an optical fiber network which carries optical signals from transmitter 110 to receiver 120. Other types of optical networks, other than an optical fiber network, may, however, be used for transmitting optical signals between transmitter 110 and receiver 120.

The configuration of network components of network environment 100 shown in FIG. 1 is for illustrative purposes. Other configurations may be implemented. Therefore, network environment 100 may include additional, fewer and/or different components, that may be configured in a different arrangement, than that depicted in FIG. 1.

Figure 2:
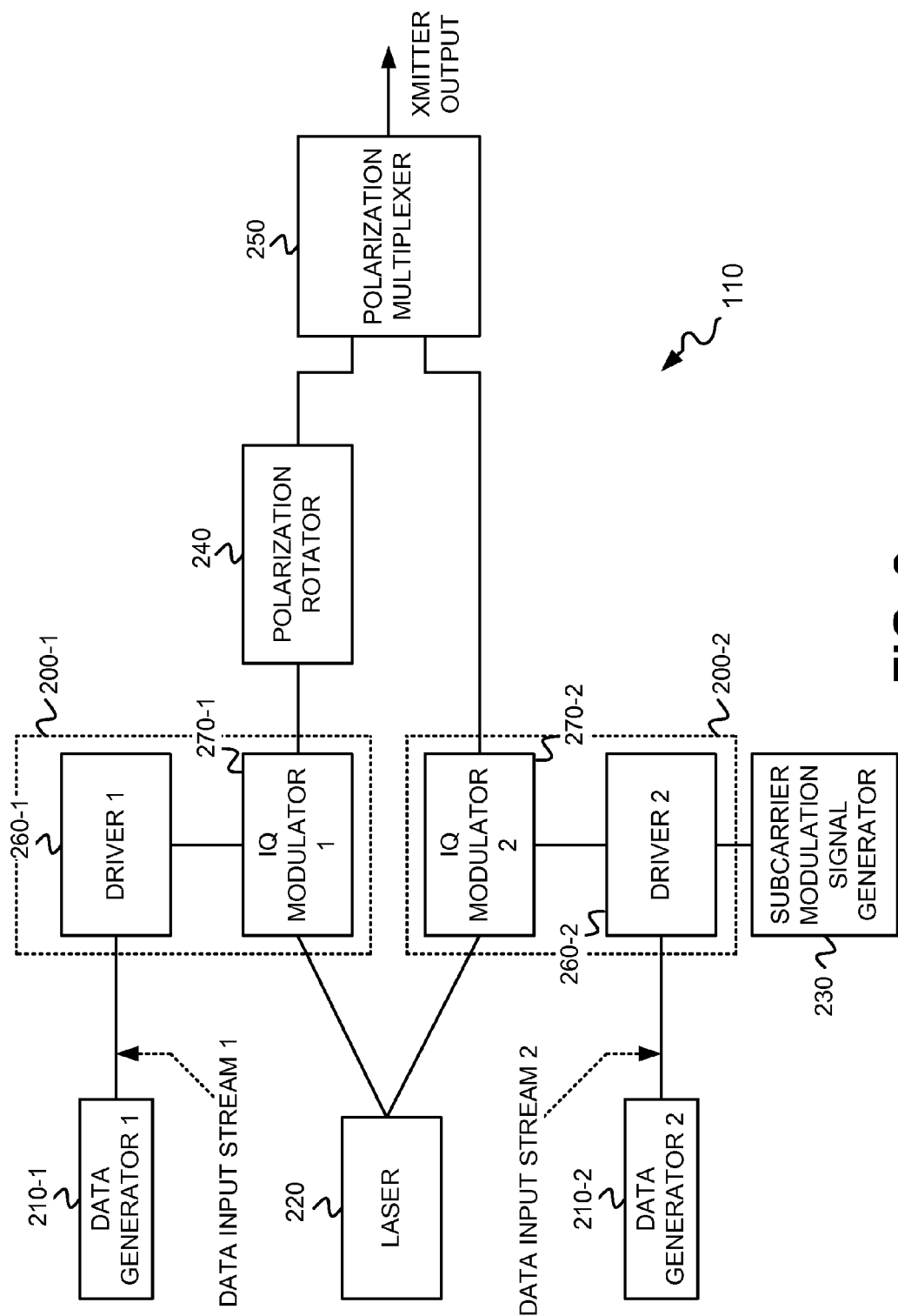
FIG. 2 depicts components of the polarization multiplexed transmitter of FIG. 1 according to an exemplary embodiment.

FIG. 2 depicts components of polarization multiplexed transmitter 110 according to an exemplary embodiment. As shown, transmitter 110 may include modulation units 200-1 and 200-2, data generators 210-1 and 210-2, a laser 220, a subcarrier modulation signal generator 230, a polarization rotator 240 and a polarization multiplexer 250.

Laser 220 may produce an optical beam that is split (e.g., via a beam splitter not shown) into a first laser output and a second laser output. Data generator 210-1 generates a first data input stream (data input stream 1) for input to modulation unit 200-1. The first data input stream may include, for example, any sequence of digital data. Modulation unit 200-1 may include a first driver 260-1 and a first IQ modulator 270-1. Driver 260-1 may generate a drive signal, based on the data input stream 1 received from data generator 210-1, and apply the drive signal to IQ modulator 270-1. IQ modulator 270-1 may modulate (e.g., using quadrature modulation) a first laser output from laser 220, based on the drive signal received from driver 260-1, to generate first output optical signals.

Data generator 210-2 generates a second data input stream (data input stream 2) for input to modulation unit 200-2. The second data input stream may include, for example, any sequence of digital data that may be different than the first data input stream generated by data generator 210-1. Subcarrier modulation signal generator 230 may generate a modulation signal that may be used to add subcarrier modulation to data input stream 2 generated by data generator 210-2. In one embodiment, the generated modulation signal may include a low frequency signal that may add low frequency subcarrier shallow modulation to data input stream 2.

Modulation unit 200-2 may include a first driver 260-2 and a second IQ modulator 270-2. Driver 260-2 may modulate data input stream 2, generated by data generator 210-2, with the output signal from subcarrier modulation signal generator 260-2 to generate a subcarrier modulated drive signal. Driver 260-2 may apply the drive signal to IQ modulator 270-2. The drive signal from driver 260-2 may, therefore, include subcarrier modulation. IQ modulator 270-2 may modulate (e.g., using IQ (quadrature modulation)) a second laser output from laser 220, based on the drive signal received from driver 260-2, to generate second output optical signals.

Polarization rotator 240 may rotate a polarization axis of the first output optical signals output from IQ modulator 270-1, to a certain angle relative to the polarization angle of the second output optical signals output from IQ modulator 270-2, to produce third output optical signals. Polarization rotator 240 may apply the third output optical signals to polarization multiplexer 250. Polarization rotator 240 may include, for example, any type of polarization rotating device that can rotate the polarization axis of a polarized light beam by an angle of choice using, for example, birefringence or total internal reflection.

Polarization multiplexer 250 may receive the third output optical signals from polarization rotator 240, and the second output optical signals from IQ modulator 270-2 and combine the second and third output optical signals into polarization multiplexed output signals using existing polarization multiplexing techniques. Polarization multiplexer 250 may include, for example, any type of polarization multiplexing device that can combine two input signals in, for example, orthogonal polarizations into one output.

The configuration of components of transmitter 110 illustrated in FIG. 2 is for illustrative purposes. Other configurations may be implemented. Therefore, transmitter 110 may include additional, fewer and/or different components than those depicted in FIG. 2. The various components of transmitter 110 of FIG. 2 have been described as performing certain operations or functions. However, any component of transmitter 110 in FIG. 2 may be capable of performing the operations or functions described as being performed by other components of transmitter 110.

Figure 3:
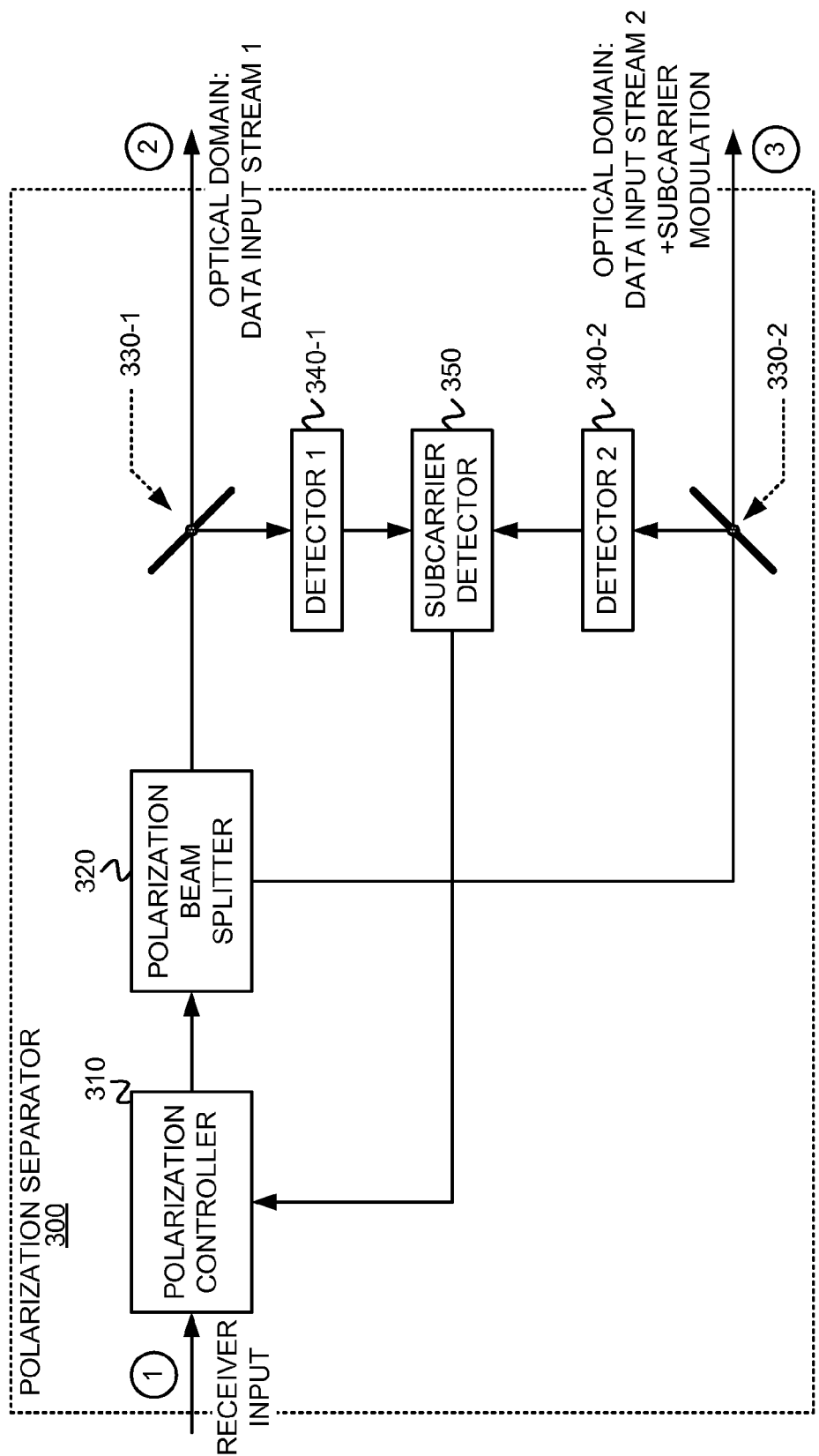
FIG. 3 depicts components of a polarization separator according to an exemplary embodiment.

FIG. 3 depicts components of a polarization separator 300, according to an exemplary embodiment, that is a component of polarization multiplexed receiver 120 as described further with respect to FIG. 4 below. Polarization separator 300 may receive polarization multiplexed optical signals (identified with a "1" within a circle in FIG. 3), containing a first data stream and a second data stream as transmitted from polarization multiplexed transmitter 110, and may operate, as described further herein with respect to FIG. 4 and FIG. 6A, upon the polarization multiplexed optical signals to separate, in an optical domain, the first data stream and the second data stream to generate a first optical output having the first data stream and a second optical output having the second data stream. Polarization separator 300 may separate the first data stream and the second data stream in the optical domain based on subcarrier modulation added to the second data stream at transmitter 110.

As shown in FIG. 3, polarization separator 300 may include a polarization controller 310, a polarization beam splitter 320, optical tappers 330-1 and 330-2, detectors 340-1 and 340-2, and a subcarrier detector 350. Polarization controller 310 receives the receiver input that includes polarization multiplexed optical signals transmitted by transmitter 110 (identified with a "1" within a circle in FIG. 3) and adjusts the optical signals' polarization based on a feedback signal received from subcarrier detector 350. Polarization beam splitter 320 may split the optical output from polarization controller 310 into two separate optical outputs with each output having a predefined polarization.

Optical tapper 330-1 taps a first output from polarization beam splitter 320 (identified with a "2" within a circle in FIG. 3), having a predefined polarization relative to the second output from polarization beam splitter 320, and applies the tapped output to optical detector 340-1. Detector 340-1 detects the tapped output from optical tapper 330-1 to produce an analog electrical version (e.g., analog voltage level) of the first optical output of polarization beam splitter 320. Optical tapper 330-2 taps a second output from polarization beam splitter 320 (identified with a "3" within a circle in FIG. 3) and applies the tapped output to optical detector 340-2. Detector 340-2 detects the tapped output from optical tapper 330-2 to produce an analog electrical version (e.g., analog voltage level) of the second optical output of polarization beam splitter 320.

Subcarrier detector 350 receives the detected output signals from detector 340-1 and the detected output signals from detector 340-2, determines a subcarrier power based on the detected output signals from detector 340-1 and 340-2, and determines a ratio of subcarrier power between the detected output signals from detector 340-1 and the detected output signals from detector 340-2. Subcarrier detector 350 determines if the determined ratio of subcarrier power is at a minimum or maximum, and adjusts a feedback signal to polarization controller 310 accordingly. The feedback signal controls the polarization of polarization controller 310. The subcarrier power minimum or maximum may be determined by subcarrier detector 350 by adjusting the level of the feedback signal to polarization controller 310 over a wide enough range so as to detect minimum and maximum levels for the determined ratio of subcarrier power. When the minimum level for the determined ratio of subcarrier power is reached through adjustment of the feedback signal from subcarrier detector 350, the first output from polarization beam splitter 320 may include data input stream 1 in the optical domain and the second output from polarization beam splitter 320 may include data input stream 2 modulated by the subcarrier modulation in the optical domain. When the maximum level for the determined ratio of subcarrier power is reached through adjustment of the feedback signal from subcarrier detector 350, the first output from polarization beam splitter 320 may include data input stream 2 modulated by the subcarrier modulation in the optical domain and the second output from polarization beam splitter 320 may include data input stream 1 in the optical domain.

The configuration of components of polarization separator 300 illustrated in FIG. 3 is for illustrative purposes. Other configurations may be implemented. Therefore, polarization separator 300 may include additional, fewer and/or different components than those depicted in FIG. 3.

Figure 4:
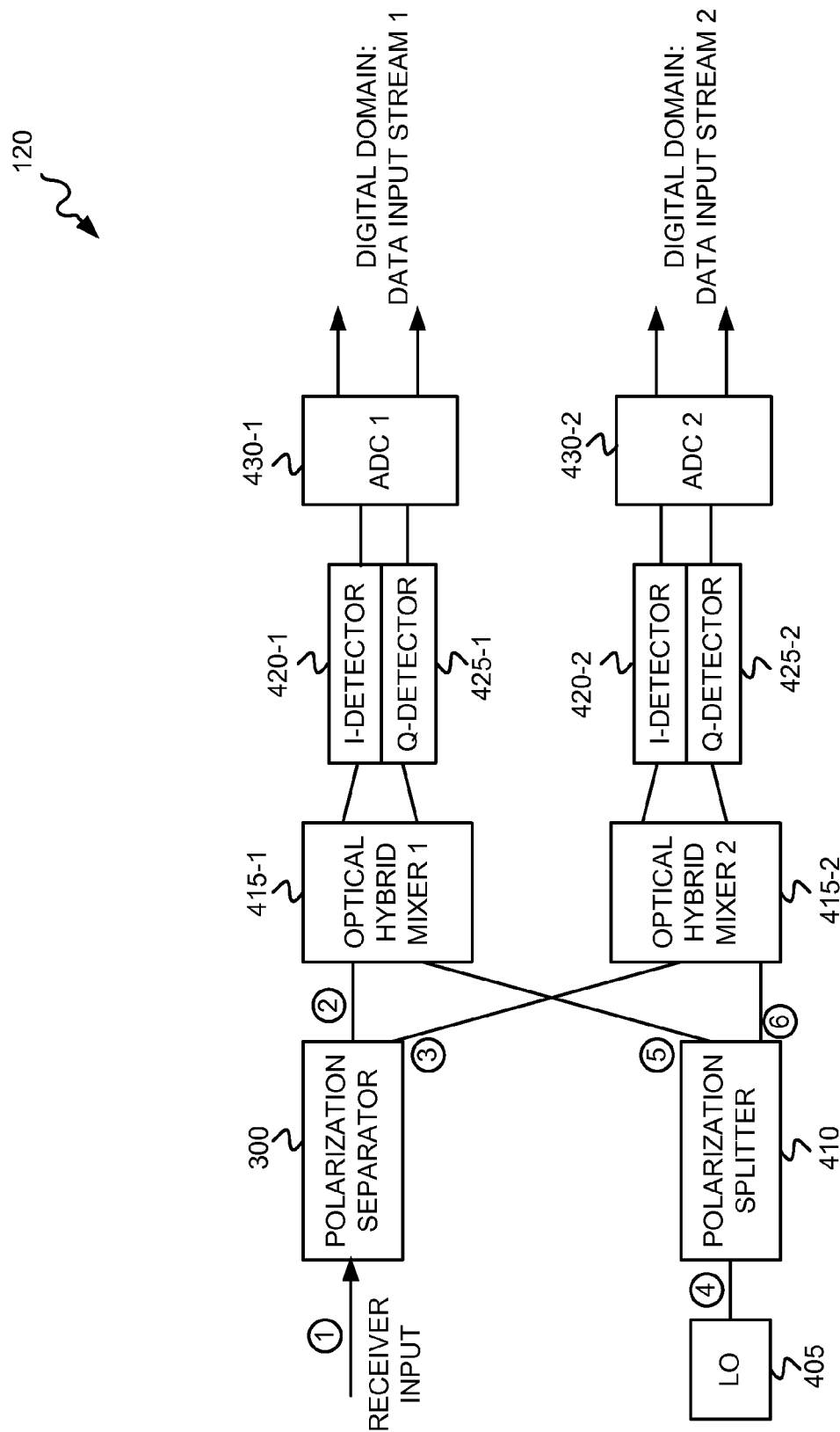
FIG. 4 depicts components of the polarization multiplexed receiver of FIG. 1 according to an exemplary embodiment.

FIG. 4 depicts components of polarization multiplexed receiver 120 according to an exemplary embodiment. As shown, receiver 120 may include polarization separator 300, a local oscillator (LO) 405, a polarization splitter 410, optical hybrid mixers 415-1 and 415-2, I-detectors 420-1 and 420-2, Q-detectors 425-1 and 425-2, and analog-to-digital converters (ADCs) 430-1 and 430-2.

Polarization separator 300 may, as described with respect to the exemplary embodiment of FIG. 3, receive polarization multiplexed optical signals and may operate upon the polarization multiplexed optical signals to separate, in an optical domain and using the subcarrier modulation added to the second data stream, the first data stream and the second data stream to generate a first optical output having the first data stream and a second optical output having the second data stream.

LO 405 may include an optical local oscillator that generates an output optical beam having a specific frequency. LO 405 may supply the output optical beam to polarization splitter 410. Polarization splitter 410 may split the output optical beam of LO 405 into a first polarized LO output, having a first polarization, and a second polarized LO output having a second, different polarization. Polarization splitter 410 may supply the first polarized LO output to optical hybrid mixer 415-1, and the second polarized LO output to optical hybrid mixer 415-2.

Optical hybrid mixer 415-1 may receive and mix the first output from polarization separator 300 (identified with a "2" within a circle in FIG. 4), containing data input stream 1, and the first polarized LO output from polarization splitter 320 (identified with a "5" within a circle in FIG. 4). I-detector 420-1 and Q-detector 425-1 may detect the output from optical hybrid mixer 415-1 to produce an analog electrical version of data input stream 1 reproduced by the mixing operation of optical hybrid mixer 415-1. ADC 430-1 may convert the analog output of I-detector 420-1 and Q-detector 425-1 to a digital version of data input stream 1 reproduced by the mixing operation of optical hybrid mixer 415-1.

Optical hybrid mixer 415-2 may receive and mix the second output from polarization separator 300 (identified with a "3" within a circle in FIG. 4), containing data input stream 2, and the second polarized LO output from polarization splitter 320 (identified with a "6" within a circle in FIG. 4). I-detector 420-2 and Q-detector 425-2 may detect the output from optical hybrid mixer 415-2 to produce an analog electrical version of data input stream 2 reproduced by the mixing operation of optical hybrid mixer 415-2. ADC 430-2 may convert the analog output of I-detector 420-2 and Q-detector 425-2 to a digital version of data input stream 2 reproduced by the mixing operation of optical hybrid mixer 415-2.

The configuration of components of receiver 120 illustrated in FIG. 4 is for illustrative purposes. Other configurations may be implemented. Therefore, receiver 120 may include additional, fewer and/or different components than those depicted in FIG. 4. For example, receiver 120 may include a processing unit (e.g., a microprocessor) (not shown in FIG. 4) and a digital clock that may control the operations of the various components of receiver 120. The various components of receiver 120 of FIG. 4 have been described as performing certain operations or functions. However, any component of receiver 120 in FIG. 4 may be capable of performing the operations or functions described as being performed by other components of receiver 120.

Figure 5:
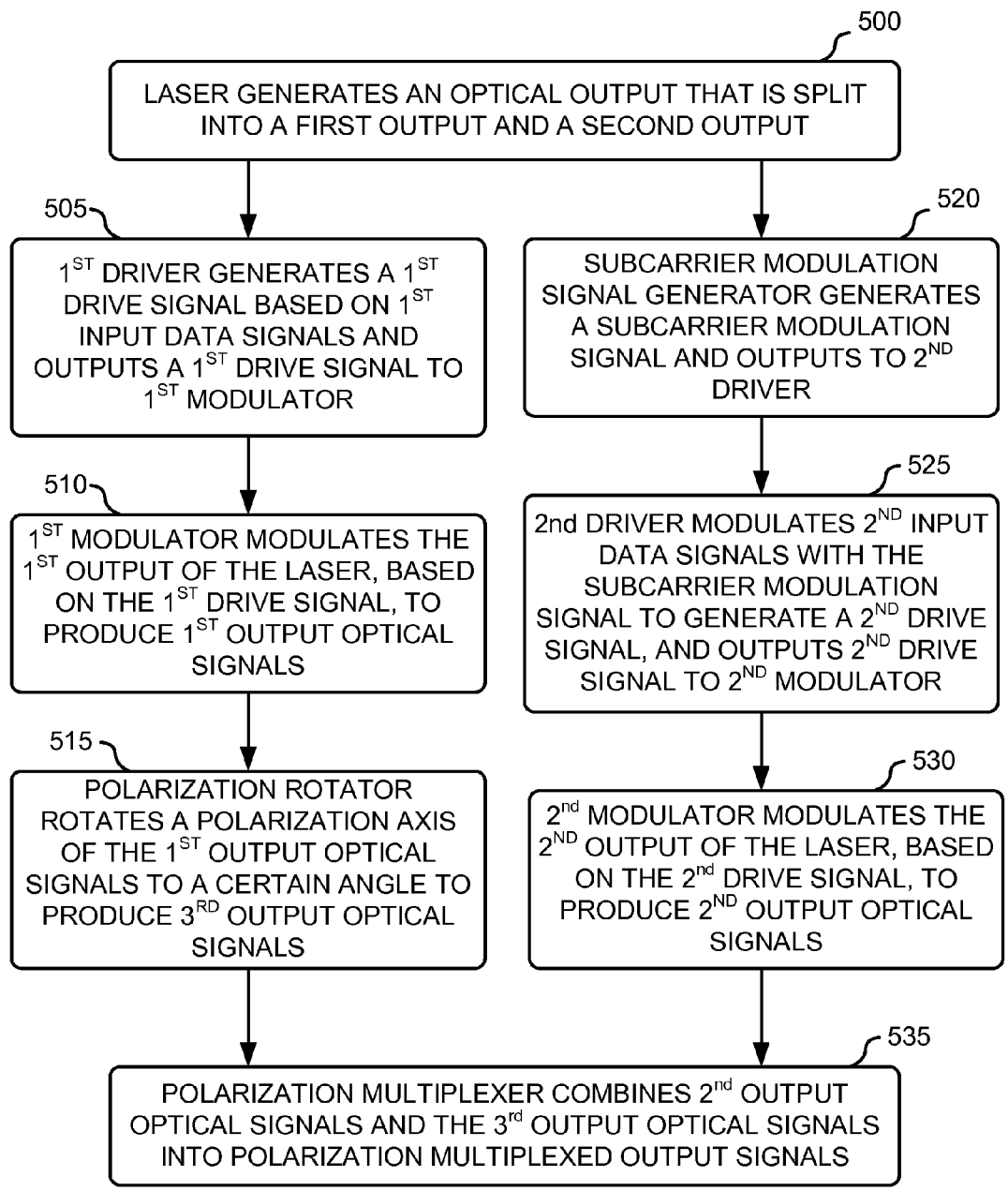
FIG. 5 is a flow diagram of an exemplary process for subcarrier modulating one of two input data streams, and polarization multiplexing and transmitting the two input data streams.

FIG. 5 is a flow diagram of an exemplary process for subcarrier modulating one of two input data streams prior to polarization multiplexing and transmitting the two input data streams. The exemplary process of FIG. 5 may be implemented by components of polarization multiplexed transmitter 110. As depicted in FIG. 5, blocks 505, 510, and 515 may occur in parallel with blocks 520, 525 and 530.

The exemplary process may include laser 220 generating an optical output that is split into a first output and a second output (block 500). An optical splitter (not shown in FIG. 2) may, for example, be used to split laser 220's optical output into two identical optical outputs that may be supplied to IQ modulator 270-1 and IQ modulator 270-2. Driver 200-1 may generate a first drive signal based on first data input signals received from data generator 210-1 and may output a first electrical drive signal to IQ modulator 270-1 (block 505). The first data input signals may include data input stream 1, where the data stream includes any sequence of digital data to be transmitted to receiver 120.

IQ modulator 270-1 may modulate the first output of laser 220, based on the first drive signal from driver 200-1, to produce first output optical signals (block 510). IQ modulator 270-1 may modulate the first output of laser 220 in accordance with the drive signal from driver 200-1 using known optical IQ modulation techniques.

Polarization rotator 240 may rotate a polarization axis of the first output optical signals from IQ modulator 270-1 to a certain angle to produce third output optical signals (block 515). Polarization rotator 240 may rotate the polarization axis of the first output optical signals from IQ modulator 270-1 to a certain angle relative to the polarization angle of laser 220's output (or the second output optical signals from IQ modulator 270-2). In one embodiment, the polarization axis of the first output optical signals may be rotated 90 degrees (or orthogonally) relative to laser 220's output.

Subcarrier modulation signal generator 230 may generate a subcarrier modulation signal and output the signal to driver 260-2 (block 520), and driver 260-2 may modulate the second input data signals received from data generator 210-2 with the subcarrier modulation signal to generate a second drive signal, and may output the second drive signal to IQ modulator 270-2 (block 525). The subcarrier modulation signal may include a low frequency electrical signal that may add low frequency subcarrier shallow modulation to data input stream 2 that is output by data generator 210-2. IQ modulator 270-2 may modulate the second output from laser 220, based on the drive signal from driver 200-2, to produce second output optical signals (block 530). IQ modulator 270-2 may modulate the second output of laser 220 in accordance with the drive signal from driver 200-2, which contains the subcarrier modulation, using known optical IQ modulation techniques.

Polarization multiplexer 250 may combine the second output optical signals from IQ modulator 270-2 and the third output optical signals from polarization rotator 240 into polarization multiplexed output signals (block 535). Polarization multiplexer 250 may polarization-division multiplex the second output optical signals from IQ modulator 270-2 and the third output optical signals from polarization rotator 240. Transmitter 110 may subsequently transmit the polarization multiplexed output signals via optical network 130 to receiver 120.

Figure 6B:
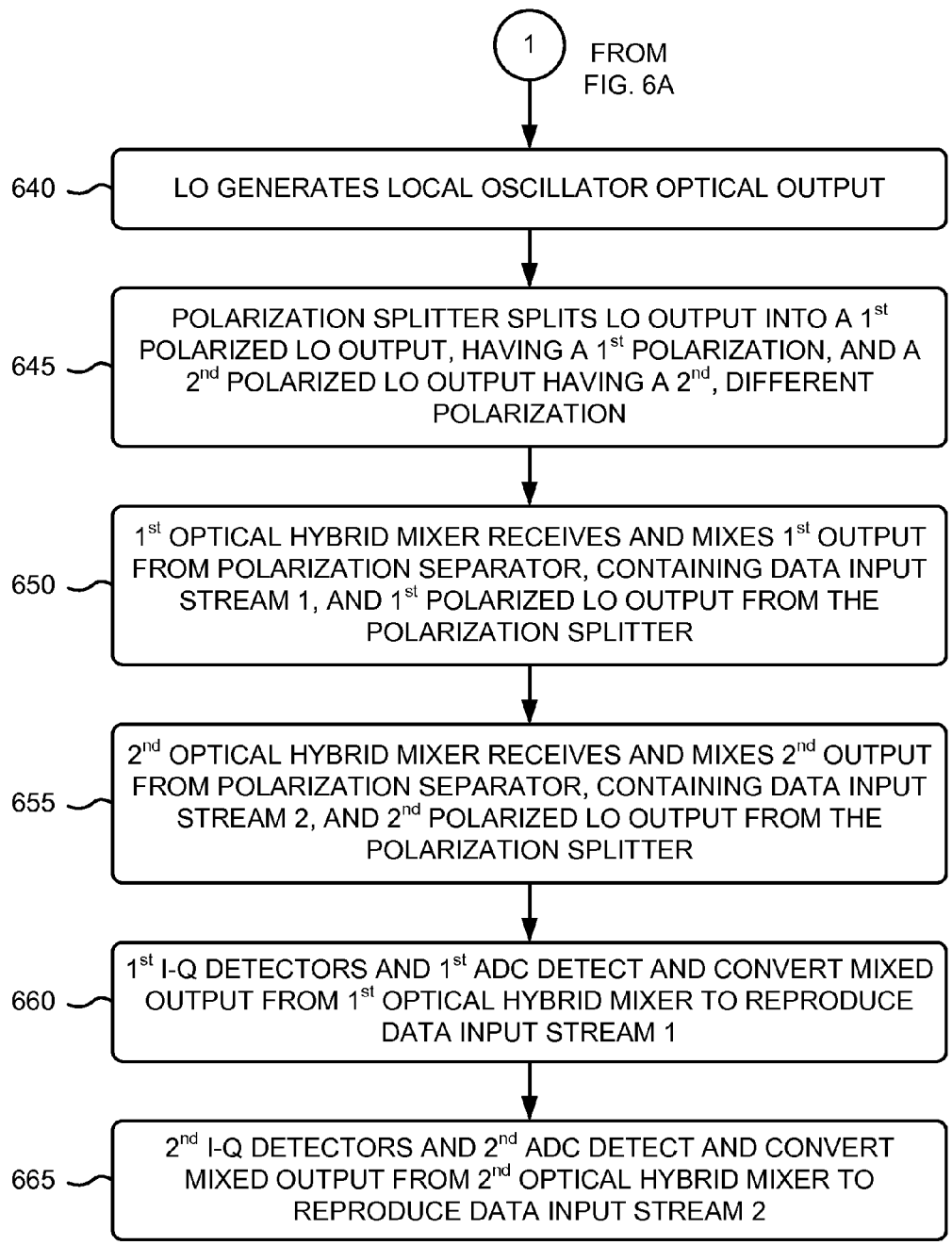

FIGS. 6A and 6B are flow diagrams of an exemplary process for separating, in the optical domain, two data streams using a polarization separator, and extracting the two data streams, in the digital domain, using optical mixing, detecting and analog-to-digital converting components of a polarization multiplexed receiver. The exemplary process of FIGS. 6A and 6B may be implemented by components of receiver 120.

The exemplary process may include polarization controller 310 receiving input polarization multiplexed optical signals from transmitter 110, and adjusting the signals' polarization based on feedback signal from subcarrier detector 350 (block 600). The input polarization multiplexed optical signals may have been generated and transmitted by transmitter 110. Polarization controller 310 may, for example, adjust the polarization of the input polarization multiplexed optical signals linearly based on the feedback signal received from subcarrier detector 350.

Polarization beam splitter 320 may split the output from polarization controller 310 into two separate optical outputs, with each output having a predefined polarization (block 605). In one embodiment, a first one of the two separate optical outputs may have a polarization angle that is orthogonal (i.e., 90 degrees) to the polarization angle of a second one of the two separate optical outputs. Optical tapper 330-1 taps a first output from polarization beam splitter 320 and applies the tapped output to optical detector 340-1 (block 610). The untapped first output (identified with a "2" within a circle in FIG. 3) from polarization beam splitter 320, that contains data input stream 1, may be supplied as an output from polarization separator 300 to optical hybrid mixer 415-1. Optical tapper 330-2 taps a second output from polarization beam splitter 320 and applies the tapped output to optical detector 340-2 (block 615). The untapped second output (identified with a "3" within a circle in FIG. 3) from polarization beam splitter 320, that contains data input stream 2 plus the subcarrier modulation, may be supplied as an output from polarization separator 300 to optical hybrid mixer 415-2.

Subcarrier detector 350 receives first detected signals from optical detector 340-1 and second detected signals from optical detector 340-2 (block 620), and determines a ratio of subcarrier power between the first detected signals from optical detector 340-1 and the second detected signals from optical detector 340-2 (block 625). Subcarrier detector 350 may determine the ratio of subcarrier power by applying a ratio of the voltage level detected at detector 340-1 and the voltage level detected at detector 340-2.

Subcarrier detector 350 determines if the ratio of subcarrier power is at a minimum or maximum (block 630). If the ratio of subcarrier power is not at a minimum or maximum (NO—block 630), then subcarrier detector 350 may adjust the feedback signal to polarization controller 310 (block 635) and the exemplary process may loop to continue at block 600. Blocks 600 through 630 and 635 may continue to loop in an iterative fashion until subcarrier detector 350 determines that the ratio of the subcarrier power is at a minimum or maximum value.

If the ratio of subcarrier power is at a minimum or a maximum (YES—block 630), then the exemplary process may continue at block 640 of FIG. 6B with LO 405 generating LO output optical signals (block 640). The subcarrier power minimum or maximum may be determined by subcarrier detector 350 by adjusting the level of the feedback signal to polarization controller 310 over a wide enough range so as to detect minimum and maximum levels for the determined ratio of subcarrier power. When the minimum level for the determined ratio of subcarrier power is reached through adjustment of the feedback signal from subcarrier detector 350, the first output from polarization beam splitter 320 may include data input stream 1 in the optical domain and the second output from polarization beam splitter 320 may include data input stream 2 modulated by the subcarrier modulation in the optical domain. When the maximum level for the determined ratio of subcarrier power is reached through adjustment of the feedback signal from subcarrier detector 350, the first output from polarization beam splitter 320 may include data input stream 2 modulated by the subcarrier modulation in the optical domain and the second output from polarization beam splitter 320 may include data input stream 1 in the optical domain.

Polarization splitter 410 splits the LO output optical signals into first polarization LO signals, having a first polarization, and second polarization LO signals having a second, different polarization (block 645). Polarization splitter 410 may split the LO output optical signals into polarization LO signals having, for example, orthogonal polarizations. Optical hybrid mixer 415-1 receives and mixes the first output from polarization separator 300, containing data input stream 1 (or, alternatively, data input stream 2 plus subcarrier modulation), and the first polarization LO signals from polarization splitter 410 (block 650). Optical hybrid mixer 415-1 uses existing mixing techniques for mixing the first output from polarization separator 300 and the first polarization LO signals from polarization splitter 410. Optical hybrid mixer 415-2 receives and mixes the second output from polarization separator 300, containing data input stream 2 plus subcarrier modulation (or, alternatively, data input stream 1), and the second polarization LO signals from polarization splitter 410 (block 650). Optical hybrid mixer 415-2 uses existing mixing techniques for mixing the second output from polarization separator 300 and the second polarization LO signals from polarization splitter 410. I-detector 420-1, Q-detector 425-1 and ADC 430-1 detect and convert the mixed output from optical hybrid mixer 315-1 to reproduce data input stream 1 (block 660), and I-detector 420-2, Q-detector 425-2, and ADC 430-2 detect and convert the mixed output from optical hybrid mixer 415-2 to reproduce data input stream 2 (block 665). ADC 430-1 may output data input stream 1 in the digital domain, and ADC 430-2 may output data input stream 2 in the digital domain.

The exemplary process of FIGS. 6A and 6B may be selectively repeated at receiver 120 for a given sequence of polarization multiplexed optical signals received from transmitter 110 (e.g., a sequence of polarization multiplexed optical signals received over n clock cycles associated with receiver 120, where n is greater than or equal to one).

Figure 7:
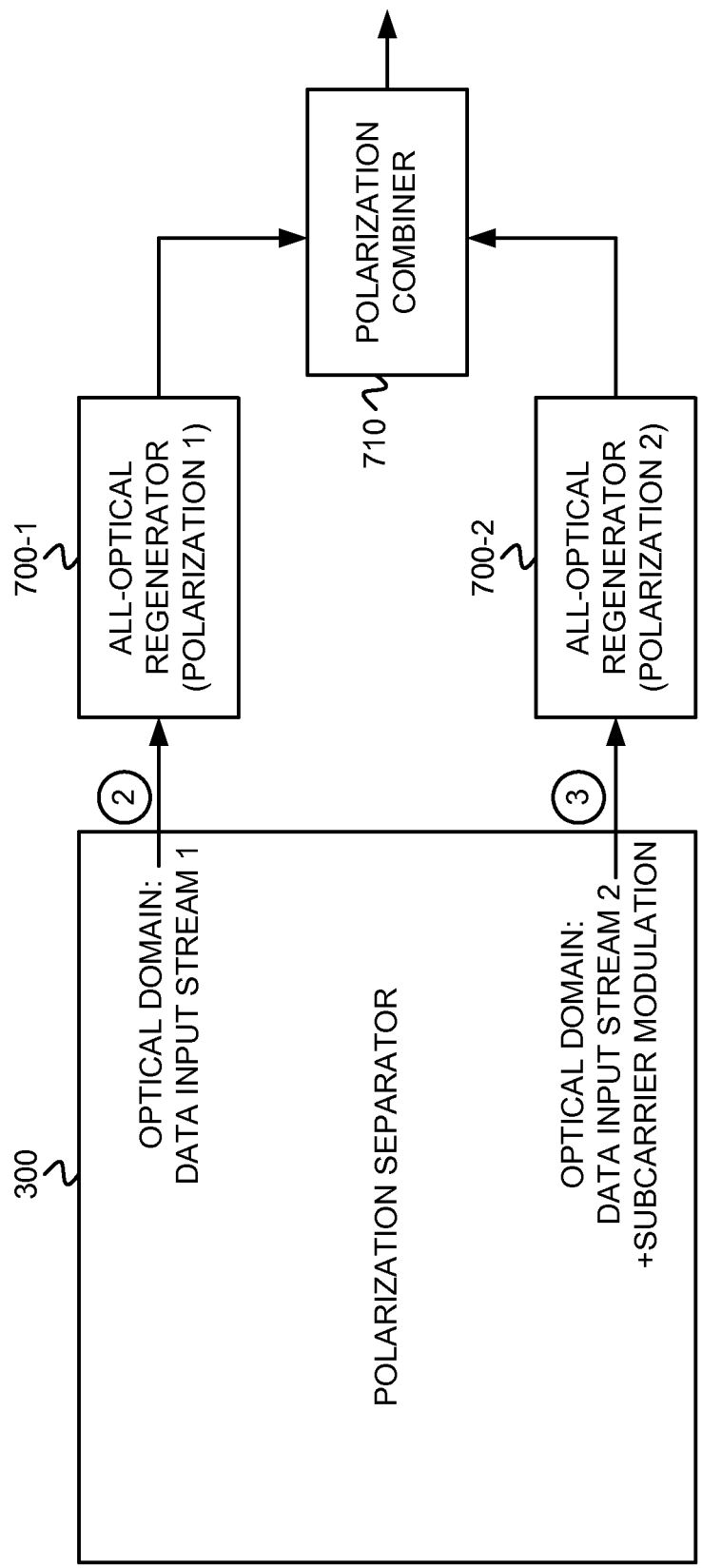
FIG. 7 is a diagram that depicts use of the polarization separator of FIG. 3 in an application that implements all-optical regeneration.

FIG. 7 is a diagram that depicts use of the polarization separator 300 of FIG. 3 in an application that implements all-optical regeneration in, for example, a receiver such as receiver 120. In this all-optical regeneration application, the first polarization separator output (shown with a "2" within a circle in FIGS. 3 and 7), having a first polarization, may be supplied to a first all-optical regenerator 700-1, and the second polarization separator output (shown with a "3" within a circle in FIGS. 3 and 7), having a second polarization, may be supplied to a second all-optical regenerator 700-2. All-optical regenerators 700-1 and 700-2 may include all-optical regeneration units that transform the optical bit streams into their original form by performing functions, such as re-amplication, reshaping, and retiming. The first output of polarization separator 300 may include the data input stream 1 in the optical domain, and the second output of polarization separator 300 may include the data input stream 2 and the subcarrier modulation in the optical domain. As shown, the output of all-optical regenerator 700-1, and the output of all-optical regenerator 700-2, may be applied to a polarization combiner 710 to produce a combined optical output. Polarization combiner 710 combines the differently polarized optical bit streams into a single optical output. Use of polarization separator 300, as shown in the application of FIG. 7, makes all-optical signal regeneration of polarization multiplexed signals feasible, thereby eliminating the digital signal processing associated with polarization demultiplexing in a coherent receiver.

The foregoing description of implementations provides illustration and description, but is not intended to be exhaustive or to limit the invention to the precise form disclosed. Modifications and variations are possible in light of the above teachings or may be acquired from practice of the invention. While series of blocks have been described with respect to FIGS. 5, 6A, and 6B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A polarization multiplexed receiver, comprising:
   a polarization separator configured to:
      receive polarization multiplexed optical signals containing a first data stream and a second data stream, wherein the second data stream contained within the polarization multiplexed optical signals is modulated with subcarrier modulation, and
      operate upon the received polarization multiplexed optical signals to separate, in an optical domain, the first data stream and the second data stream,
   wherein the polarization separator comprises:
      a polarization controller configured to adjust the polarization multiplexed signals' polarization, based on a feedback signal, to produce first output optical signals;
      a polarization beam splitter configured to split the first output optical signals into two separate optical outputs with each of the two separate outputs having a predefined polarization, wherein the two separate optical outputs comprise a first polarization beam splitter optical output and a second polarization beam splitter optical output;
      a first optical tapper configured to tap the first polarization beam splitter optical output;
      a first detector configured to detect an output of the first optical tapper to produce first analog voltages associated with the first polarization beam splitter optical output;
      a second optical tapper configured to tap the second polarization beam splitter optical output; and
      a second detector configured to detect an output of the second optical tapper to produce second analog voltages associated with the second polarization beam splitter optical output,
      a subcarrier detector configured to:
         receive the first analog voltages from the first detector and the second analog voltages from the second detector,
         adjust a level of the feedback signal to the polarization controller over a range to determine both a minimum level, and a maximum level, of a ratio of subcarrier power using the first analog voltages and the second analog voltages,
         wherein, when the level of the feedback signal is adjusted such that the ratio of the subcarrier power is determined to be the minimum level, the first polarization beam splitter optical output includes the first data stream, in the optical domain, and the second polarization beam splitter optical output includes the second data stream modulated by the subcarrier modulation, in the optical domain, and
         wherein, when the level of the feedback signal is adjusted such that the ratio of the subcarrier power is determined to be the maximum level, the first polarization beam splitter optical output includes the second data stream modulated by the subcarrier modulation, in the optical domain, and the second polarization beam splitter optical output includes the first data stream, in the optical domain,
      optical mixing, detecting and analog-to-digital converting components configured to:
         receive the first polarization beam splitter optical output and the second polarization beam splitter optical output from the polarization separator,
         extract, in a digital domain when the subcarrier detector adjusts the level of the feedback signal such that the ratio of the subcarrier power is at the minimum level, the first data stream from the first polarization beam splitter optical output of the polarization separator and the second data stream from the second polarization beam splitter optical output of the polarization separator, and
         extract, in the digital domain when the subcarrier detector adjusts the level of the feedback signal such that the ratio of the subcarrier power is at the maximum level, the second data stream from the first polarization beam splitter optical output of the polarization separator and the first data stream from the second polarization beam splitter optical output of the polarization separator.

2. The receiver of claim 1, further comprising:
   a local oscillator configured to generate an output optical beam having a specific frequency; and
   a polarization splitter configured to split the output optical beam into a first polarized local oscillator output, having a first polarization, and a second polarized local oscillator output having a second, different polarization.

3. The receiver of claim 2, wherein the optical mixing, detecting and analog-to-digital converting components comprise:
   a first hybrid optical mixer configured to receive and mix the first polarization beam splitter optical output from the polarization separator and the first polarized local oscillator output from the local oscillator;
   a second hybrid optical mixer configured to receive and mix the second polarization beam splitter optical output from the polarization separator and the second polarized local oscillator output from the local oscillator;
   first I-Q detectors configured to detect an output from the first hybrid optical mixer to produce an analog reproduction of the first data stream;
   a first analog-to-digital converter (ADC) configured to convert the analog reproduction of the first data stream to a digital reproduction of the first data stream;
   second I-Q detectors configured to detect an output from the second hybrid optical mixer to produce an analog reproduction of the second data stream; and
   a second ADC configured to convert the analog reproduction of the second data stream to a digital reproduction of the second data stream.

4. The polarization multiplexed receiver of claim 1, wherein, when determining the minimum level, and the maximum level, of the ratio of the subcarrier power, the subcarrier detector is further configured to:
   apply, when adjusting the level of the feedback signal to the polarization controller over the range, a ratio of a first voltage level associated with the first analog voltages to a second voltage level associated with the second analog voltages.

5. The polarization multiplexed receiver of claim 1, wherein, when adjusting the polarization multiplexed signals' polarization, the polarization controller is further configured to:
adjust the polarization of the polarization multiplexed signals linearly based on the feedback signal.

6. An optical receiver, comprising:
a polarization controller configured to:
receive polarization multiplexed optical signals containing a first data stream and a second data stream, wherein the second data stream contained within the polarization multiplexed optical signals is modulated with subcarrier modulation, and
adjust the polarization multiplexed signals' polarization, based on a feedback signal, to produce first output optical signals;
a polarization beam splitter configured to split the first output optical signals into two separate optical outputs with each of the two separate outputs having a predefined polarization, wherein the two separate optical outputs comprise a first polarization beam splitter optical output and a second polarization beam splitter optical output;
a first optical tapper configured to tap the first polarization beam splitter optical output;
a first detector configured to detect an output of the first optical tapper to produce first analog voltages associated with the first polarization beam splitter optical output;
a second optical tapper configured to tap the second polarization beam splitter optical output; and
a second detector configured to detect an output of the second optical tapper to produce second analog voltages associated with the second polarization beam splitter optical output, and
a subcarrier detector configured to:
adjust a level of the feedback signal provided to the polarization controller over a range to determine both a minimum level, and a maximum level, of a ratio of subcarrier power using the first analog voltages from the first detector and the second analog voltages from the second detector,
wherein, when the level of the feedback signal is adjusted such that the ratio of the subcarrier power is determined to be the minimum level, the first polarization beam splitter optical output includes the first data stream, in the optical domain, and the second polarization beam splitter optical output includes the second data stream modulated by the subcarrier modulation, in the optical domain, and
wherein, when the level of the feedback signal is adjusted such that the ratio of the subcarrier power is determined to be the maximum level, the first polarization beam splitter optical output includes the second data stream modulated by the subcarrier modulation, in the optical domain, and the second polarization beam splitter optical output includes the first data stream, in the optical domain.

7. The optical receiver of claim 6, wherein, when determining the minimum level, and the maximum level of the ratio of the subcarrier power, the subcarrier detector is further configured to:
apply, when adjusting the level of the feedback signal provided to the polarization controller over the range, a ratio of a first voltage level of the first analog voltages to a second voltage level of the second analog voltages.

8. The optical receiver of claim 6, further comprising:
optical mixing, detecting and analog-to-digital converting components configured to:
receive the first polarization beam splitter optical output and the second polarization beam splitter optical output from the polarization beam splitter,
extract, in a digital domain when the subcarrier detector adjusts the level of the feedback signal such that the ratio of the subcarrier power is at the minimum level, the first data stream from the first polarization beam splitter optical output of the the polarization beam splitter and the second data stream from the second polarization beam splitter optical output of the polarization beam splitter, and
extract, in the digital domain when the subcarrier detector adjusts the level of the feedback signal such that the ratio of the subcarrier power is at the maximum level, the second data stream from the first polarization beam splitter optical output of the polarization beam splitter and the first data stream from the second polarization beam splitter optical output of the polarization beam splitter.

9. The optical receiver of claim 8, further comprising:
a local oscillator configured to generate an output optical beam having a specific frequency; and
a polarization splitter configured to split the output optical beam into a first polarized local oscillator output, having a first polarization, and a second polarized local oscillator output having a second, different polarization.

10. The optical receiver of claim 9, wherein the optical mixing, detecting and analog-to-digital converting components comprise:
a first hybrid optical mixer configured to receive and mix the first polarization beam splitter optical output from the polarization beam splitter and the first polarized local oscillator output from the local oscillator;
a second hybrid optical mixer configured to receive and mix the second polarization beam splitter optical output from the polarization beam splitter and the second polarized local oscillator output from the local oscillator;
first I-Q detectors configured to detect an output from the first hybrid optical mixer to produce an analog reproduction of the first data stream;
a first analog-to-digital converter (ADC) configured to convert the analog reproduction of the first data stream to a digital reproduction of the first data stream;
second I-Q detectors configured to detect an output from the second hybrid optical mixer to produce an analog reproduction of the second data stream; and
a second ADC configured to convert the analog reproduction of the second data stream to a digital reproduction of the second data stream.

11. The optical receiver of claim 6, wherein, when adjusting the polarization multiplexed signals' polarization, the polarization controller is further configured to:
adjust the polarization of the polarization multiplexed signals linearly based on the feedback signal.

12. The optical receiver of claim 6, further comprising:
a first all-optical regenerator coupled to the first polarization beam splitter optical output of the polarization beam splitter and configured to transform first optical signals associated with the first polarization beam splitter optical output into a first optical stream comprising the first data stream; and a second all-optical regenerator coupled to a second polarization beam splitter optical output of the polarization beam splitter and configured to transform second optical signals associated with the second polarization beam splitter optical output into a second optical stream comprising the second data stream.

13. The optical receiver of claim 12, wherein the first optical stream has a first polarization and the second optical stream has a second polarization, and further comprising:
a polarization combiner configured to combine the first optical stream with the second optical stream to produce a combined optical output.

14. An optical receiver, comprising:
a polarization controller configured to:
receive polarization multiplexed optical signals containing a first data stream and a second data stream, wherein the first data stream contained within the polarization multiplexed optical signals is modulated with subcarrier modulation, and
adjust the polarization multiplexed signals' polarization, based on a feedback signal, to produce first output optical signals;
a polarization beam splitter configured to split the first output optical signals into two separate optical outputs with each of the two separate outputs having a predefined polarization;
a first optical tapper configured to tap a first one of the two separate optical outputs of the polarization beam splitter;
a first detector configured to detect an output of the first optical tapper to produce first analog voltages associated with the first one of the two separate optical outputs of the polarization beam splitter;
a second optical tapper configured to tap a second one of the two separate optical outputs of the polarization beam splitter;
a second detector configured to detect an output of the second optical tapper to produce second analog voltages associated with the second one of the two separate optical outputs of the polarization beam splitter;
a subcarrier detector configured to:
determine a ratio of subcarrier power using the first analog voltages from the first detector and the second analog voltages from the second detector, and
generate the feedback signal and provide the feedback signal to the polarization controller based on the determined ratio of subcarrier power;
a first all-optical regenerator coupled to a first optical output of the two separate optical outputs of the polarization beam splitter and configured to transform first optical signals associated with the first optical output into a first optical stream comprising the first data stream; and
a second all-optical regenerator coupled to a second optical output of the two separate optical outputs of the polarization beam splitter and configured to transform second optical signals associated with the second optical output into a second optical stream comprising the second data stream.

15. The optical receiver of claim 14, wherein, when determining the ratio of subcarrier power, the subcarrier detector is further configured to:
determine if the ratio of subcarrier power is at a minimum or maximum, and
adjust a level of the feedback signal until the ratio of subcarrier power is at either the minimum or the maximum.

16. The optical receiver of claim 14, wherein, when determining the ratio of subcarrier power, the subcarrier detector is further configured to:
apply a ratio of a voltage level of the first analog voltages to a voltage level of the second analog voltages.

17. The optical receiver of claim 14, wherein the subcarrier detector is further configured to:
adjust a level of the feedback signal to the polarization controller over a range to determine both a minimum level, and a maximum level, of the ratio of subcarrier power using the first analog voltages and the second analog voltages.

18. The optical receiver of claim 17, wherein, when determining the minimum level, and the maximum level of the ratio of the subcarrier power, the subcarrier detector is further configured to:
apply, when adjusting the level of the feedback signal provided to the polarization controller over the range, a ratio of a first voltage level of the first analog voltages to a second voltage level of the second analog voltages.

19. The optical receiver of claim 17, wherein, when the level of the feedback signal is adjusted such that the ratio of the subcarrier power is determined to be the minimum level, a first optical output of the two separate optical outputs of the polarization beam splitter includes the first data stream, in the optical domain, and a second optical output of the two separate optical outputs of the polarization beam splitter includes the second data stream modulated by the subcarrier modulation, in the optical domain, and
wherein, when the level of the feedback signal is adjusted such that the ratio of the subcarrier power is determined to be the maximum level, the first optical output of the two separate optical outputs of the polarization beam splitter includes the second data stream modulated by the subcarrier modulation, in the optical domain, and the second optical output of the two separate optical outputs of the polarization beam splitter includes the first data stream, in the optical domain.

20. An optical receiver, comprising:
a polarization controller configured to:
receive polarization multiplexed optical signals containing a first data stream and a second data stream, wherein the first data stream contained within the polarization multiplexed optical signals is modulated with subcarrier modulation, and
adjust the polarization multiplexed signals' polarization, based on a feedback signal, to produce first output optical signals;
a polarization beam splitter configured to split the first output optical signals into two separate optical outputs with each of the two separate outputs having a predefined polarization;
a first optical tapper configured to tap a first one of the two separate optical outputs of the polarization beam splitter;
a first detector configured to detect an output of the first optical tapper to produce first analog voltages associated with the first one of the two separate optical outputs of the polarization beam splitter;
a second optical tapper configured to tap a second one of the two separate optical outputs of the polarization beam splitter;
a second detector configured to detect an output of the second optical tapper to produce second analog voltages associated with the second one of the two separate optical outputs of the polarization beam splitter;

a subcarrier detector configured to:
- determine a ratio of subcarrier power using the first analog voltages from the first detector and the second analog voltages from the second detector, and
- generate the feedback signal and provide the feedback signal to the polarization controller based on the determined ratio of subcarrier power;

a first all-optical regenerator coupled to a first optical output of the two separate optical outputs of the polarization beam splitter and configured to transform first optical signals associated with the first optical output into a first optical stream comprising the first data stream; and a second all-optical regenerator coupled to a second optical output of the two separate optical outputs of the polarization beam splitter and configured to transform second optical signals associated with the second optical output into a second optical stream comprising the second data stream, wherein the first optical stream has a first polarization and the second optical stream has a second polarization, and further comprising:

a polarization combiner configured to combine the first optical stream with the second optical stream to produce a combined optical output.

* * * * *